US010825337B2

(12) United States Patent
Piech et al.

(10) Patent No.: US 10,825,337 B2
(45) Date of Patent: Nov. 3, 2020

(54) AUTONOMOUS COMMISSIONING AND INSPECTION OF ALARM SYSTEMS (71) Applicant: Carrier Corporation, Palm Beach Gardens, FL (US)

(72) Inventors: Marcin Piech, Fast Hampton, CT (US); Tadeusz Pawel Witczak, Farmington, CT (US); Craig Drew Bogli, Avon, CT (US); Stella M. Oggianu, Farmington, CT (US); Srinivasa Reddy Pilli, Hyderabad (IN); Vinay Kumar Vinnakota, Hyderabad (IN); Prasad Babu Lakshmipathy, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/373,814

(22) Filed: Apr. 3, 2019

(65) Prior Publication Data
US 2019/0318613 A1 Oct. 17, 2019

Related U.S. Application Data (60) Provisional application No. 62/656,726, filed on Apr. 12, 2018.

(51) Int. Cl.
*G08B 29/20* (2006.01)
*B64C 39/02* (2006.01)
(Continued)

(52) U.S. Cl.
CPC ............ *G08B 29/20* (2013.01); *B64C 39/024* (2013.01); *G08B 17/06* (2013.01); *G08B 29/145* (2013.01);
(Continued)

(58) Field of Classification Search
CPC .................................................... G08B 29/145
See application file for complete search history.

(56) References Cited

U.S. PATENT DOCUMENTS 6,364,026 B1 4/2002 Doshay
9,061,102 B2 6/2015 Levien et al.
(Continued)

FOREIGN PATENT DOCUMENTS

DE 102012003190 A1 8/2013
GB 1010704 A 11/1965
(Continued)

OTHER PUBLICATIONS

Mohammadreza et al., "Innovative Automated Control System for PV Fields Inspection and Remote Control," Nov. 2015, IEEE Transactions on Industrail Electornics, vol. 62, No. 11, 7287-7296 (Year: 2015).*
(Continued)

*Primary Examiner* — Nabil H Syed
*Assistant Examiner* — Cal J Eustaquio
(74) *Attorney, Agent, or Firm* — Cantor Colburn LLP (57) ABSTRACT A method and system for testing a device in a fire control system is disclosed. A method includes a method and system for testing a device in a fire control system is disclosed. A method includes placing the device in a testing mode; isolating the device from other devices in the fire alarm system; testing the device; and removing the device from testing mode; wherein testing the device comprises using an unmanned inspection vehicle to remotely perform tests or other tasks on the device.

19 Claims, 2 Drawing Sheets (51) Int. Cl.
  *G08B 17/06* (2006.01)
  *G08B 29/14* (2006.01)
(52) U.S. Cl.
  CPC .. *B64C 2201/126* (2013.01); *B64C 2201/128* (2013.01)

(56) References Cited

U.S. PATENT DOCUMENTS

| | | | |
|---|---|---|---|
| 9,334,051 | B2 | 5/2016 | Masticola et al. |
| 9,471,059 | B1 | 10/2016 | Wilkins |
| 9,733,644 | B2 | 8/2017 | Levien et al. |
| 9,833,647 | B2 | 12/2017 | Kawiecki |
| 2008/0084291 | A1 | 4/2008 | Campion et al. |
| 2008/0266121 | A1* | 10/2008 | Ellul ............ G08B 7/066 340/584 |
| 2009/0126979 | A1* | 5/2009 | Chae ............ H05K 1/0269 174/257 |
| 2015/0248832 | A1* | 9/2015 | Piccolo ............ G08B 29/145 340/514 |
| 2015/0314434 | A1* | 11/2015 | Bevins, Jr. ............ B25F 5/00 30/514 |
| 2016/0054733 | A1 | 2/2016 | Hollida et al. |
| 2017/0073069 | A1 | 3/2017 | Kao et al. |
| 2017/0105129 | A1 | 4/2017 | Teplin et al. |
| 2017/0276284 | A1* | 9/2017 | Finodeyev ............ G01M 3/2815 |
| 2018/0086453 | A1* | 3/2018 | Scott-Nash ............ G08G 5/0069 |

FOREIGN PATENT DOCUMENTS

| | | |
|---|---|---|
| KR | 101249310 B1 | 4/2013 |
| KR | 20170101716 A | 9/2017 |
| WO | 2014080385 A2 | 5/2014 |
| WO | 2015077767 A1 | 5/2015 |
| WO | 2017071969 A1 | 5/2017 |
| WO | 2017083430 A1 | 5/2017 |
| WO | 2018010915 A1 | 1/2018 |

OTHER PUBLICATIONS

European Search Report for application EP 19167554.5, dated Sep. 9, 2019, 8 pages.

* cited by examiner

FIG. 1

FIG. 2

AUTONOMOUS COMMISSIONING AND INSPECTION OF ALARM SYSTEMS

CROSS-REFERENCE TO RELATED APPLICATIONS

This application claims the benefit of U.S. provisional patent application Ser. No. 62/656,726, filed Apr. 12, 2018, the entire contents of which are incorporated herein by reference.

BACKGROUND

Exemplary embodiments pertain to the art of electronics. In particular, the present disclosure relates to a method and system for autonomous commissioning and inspection of alarm systems.

When an alarm system or a component of a system is installed or commissioned, there is generally a testing process that the alarm system undergoes. Testing may also take place in other situations as well, such as for occasional maintenance or when problems have been detected during operation. The testing can include testing of operability, such as determining whether the alarm system is operational.

BRIEF DESCRIPTION

According to one embodiment, a method and system for testing a device in a fire control system is disclosed. A method includes placing the device in a testing mode; isolating the device from other devices in the fire alarm system; testing the device; and removing the device from testing mode; wherein testing the device comprises using an unmanned inspection vehicle to remotely perform tests on the device.

In addition to one or more features described above, or as an alternative, further embodiments may include wherein the unmanned inspection vehicle comprises a remotely operated vehicle configured to travel to a vicinity of the device for testing.

In addition to features described above, or as an alternative, further embodiments may include wherein the unmanned inspection vehicle comprises an unmanned aerial vehicle or an unmanned ground vehicle.

In addition to features described above, or as an alternative, further embodiments may include wherein the unmanned inspection vehicle is configured to: travel to a predetermined distance from the device; and to measure audio or visual output from the device upon activation of the device.

In addition to features described above, or as an alternative, further embodiments may include wherein the unmanned inspection vehicle is configured to dispense a substance in the vicinity of the device, the substance configured to activate a sensor.

In addition to features described above, or as an alternative, further embodiments may include finding the device prior to placing the device in the testing mode; wherein finding the device comprises using the unmanned inspection vehicle to find the device.

In addition to features described above, or as an alternative, further embodiments may include wherein finding the device comprises using machine vision capabilities of the unmanned inspection vehicle to identify the device.

In addition to features described above, or as an alternative, further embodiments may include wherein finding the device comprises configuring the device to broadcast a location signal; and using the unmanned inspection vehicle to receive the location signal and travel to the location of the device.

In addition to features described above, or as an alternative, further embodiments may include wherein broadcasting the location signal comprises broadcasting a unique identifier of the device by one or more audio or visual signals.

In addition to features described above, or as an alternative, further embodiments may include wherein broadcasting the location signal comprises broadcasting a unique identifier of the device by radio frequency signals.

In addition to features described above, or as an alternative, further embodiments may include wherein finding the device comprises sending the unmanned inspection vehicle to proceed to a known location of the device.

In addition to features described above, or as an alternative, further embodiments may include wherein isolating the device comprises configuring a control panel coupled to the device such that the device does not receive alarm signals from the control panel and the control panel does not forward alerts generated by the device to other devices coupled to the control panel.

In addition to features described above, or as an alternative, further embodiments may include wherein the unmanned inspection vehicle operates autonomously or remotely by a human operator.

In addition to features described above, or as an alternative, further embodiments may include wherein the unmanned inspection vehicle is remotely operated by a control center.

In addition to features described above, or as an alternative, further embodiments may include wherein the unmanned inspection vehicle transmits to the control center a result of testing the device.

In addition to features described above, or as an alternative, further embodiments may include wherein the control center directs the unmanned inspection vehicle to test the device according to a schedule.

According to one embodiment, a method and system for testing a device in a fire control system is disclosed. A system includes a control panel including a processor and a memory, and the system further includes an unmanned inspection vehicle. The processor is configured to perform a method. The method includes placing the device in a testing mode; isolating the device from other devices in the fire alarm system; testing the device; and removing the device from testing mode; wherein testing the device comprises using the unmanned inspection vehicle to remotely perform tests on the device.

In addition to one or more features described above, or as an alternative, further embodiments may include wherein the unmanned inspection vehicle comprises a remotely operated vehicle configured to travel to a vicinity of the device for testing.

In addition to features described above, or as an alternative, further embodiments may include wherein the unmanned inspection vehicle comprises an unmanned aerial vehicle or an unmanned ground vehicle.

In addition to features described above, or as an alternative, further embodiments may include wherein the unmanned inspection vehicle is configured to travel to a predetermined distance from the device; and to measure audio or visual output from the device upon activation of the device.

In addition to features described above, or as an alternative, further embodiments may include wherein the unmanned inspection vehicle is configured to dispense a substance in the vicinity of the device, the substance configured to activate a sensor.

In addition to features described above, or as an alternative, further embodiments may include wherein the unmanned inspection vehicle is configured to clean the device.

In addition to features described above, or as an alternative, further embodiments may include wherein the unmanned inspection vehicle is configured to replace at least a portion of the device.

In addition to features described above, or as an alternative, further embodiments may include wherein the unmanned inspection vehicle is configured to transmit, to a control center, testing data comprising a result of testing the device.

In addition to features described above, or as an alternative, further embodiments may include wherein the control center is configured to generate a report describing a testing history of the device, based at least in part on the testing data.

In addition to features described above, or as an alternative, further embodiments may include wherein the unmanned inspection vehicle is configured to activate a manually operated device.

In addition to features described above, or as an alternative, further embodiments may include wherein isolating the device comprises configuring a control panel coupled to the device such that the device does not receive alarm signals from the control panel and the control panel does not forward alerts generated by the device to other devices coupled to the control panel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be noted that, although aspects are discussed in conjunction with fire control systems, embodiments can be used with any type of control system, including indoor environmental quality (IEQ) systems. An IEQ system includes measurements of levels of particulates in the air, such as the level of carbon monoxide, carbon dioxide, temperature, humidity, ozone, and the like.

Figure 1:
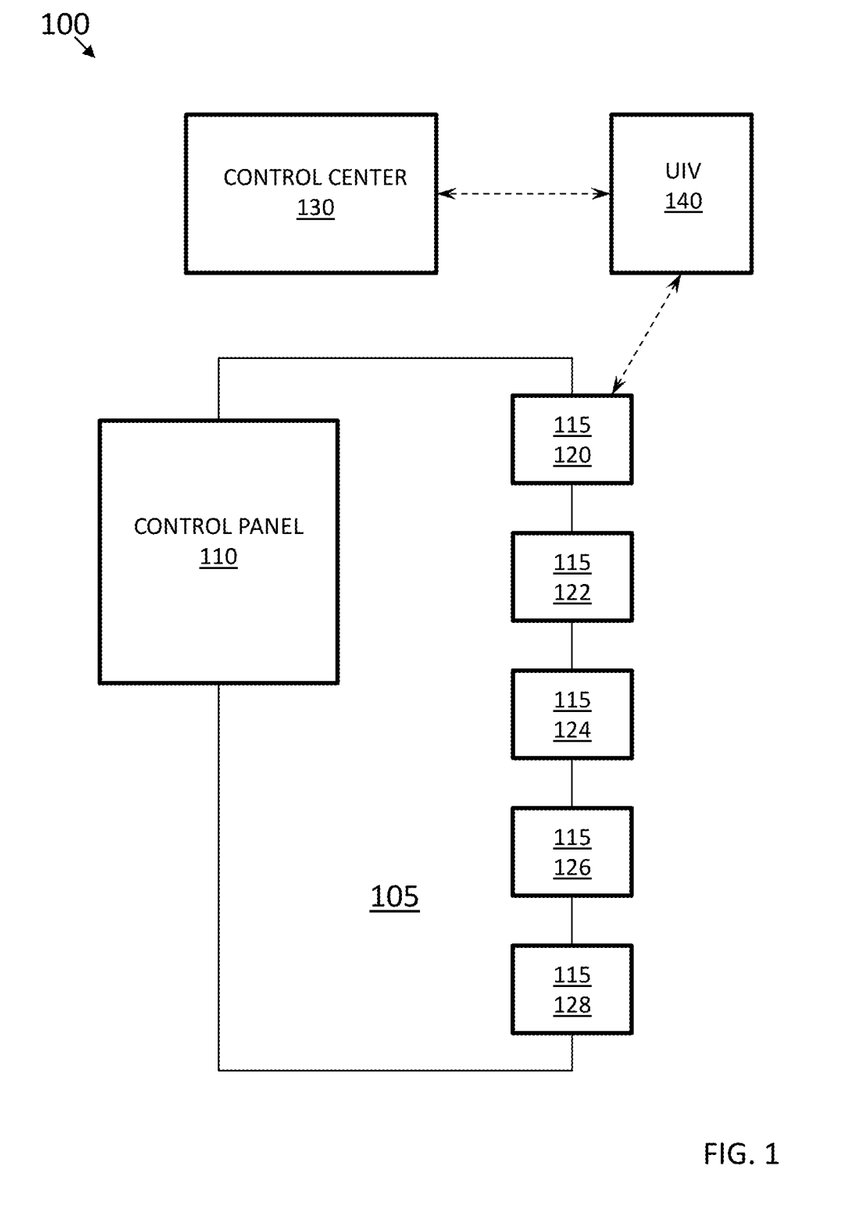
FIG. 1 is a block diagram illustrating an exemplary inspection system of one or more embodiments.

A block diagram illustrating an exemplary inspection system 100 of some embodiments is presented in FIG. 1. Inspection system 100 includes a control panel 110 and a plurality of devices 115, such as devices 120, 122, 124, 126, and 128. Devices 120, 122, 124, 126, and 128 form a control loop 105 of devices 115, in that control panel 110 is coupled to device 120 and device 128. Device 122 is coupled to devices 120 and 124, device 124 is coupled to devices 122 and 126, and device 126 is coupled to devices 124 and 128, such that each device in the control loop 105 is communicatively coupled to the control panel 110. In one exemplary embodiment, the coupling between devices 120, 122, 124, 126, and 128 is in the form or a low-power circuit. A low amount of voltage (e.g., on the order of 12 to 42 volts) may be supplied by control panel 110 to each of devices 120, 122, 124, 126, and 128. While only five devices 115 are shown in FIG. 1, it should be understood that any number of devices can be present in the system 100. While a wired connection is described above, it should be understood that a wireless connection between devices 115 also can be used, alternatively or in addition to a combination of wired devices and wireless devices; where wireless connection is used, voltage may be supplied from a source such as a battery or hard-wiring to an external power source.

Further, in some embodiments, the inspection system 100 includes a control center 130 and an unmanned inspection vehicle (UIV) 140. As described further below, the control center 130 and the UIV 140 may be communication with each other to inspect devices 115 in the control loop 105.

In some embodiments, the control panel 110 is a computing device that includes a processor, a memory, receiving capabilities, and transmitting capabilities. The receiving and transmitting capabilities may use any form of wired or wireless communication.

Devices 120, 122, 124, 126, and 128 may be one of a variety of different devices 115 that are used in an alarm system, fire protection system, or other type of system being tested. Exemplary devices include sirens, bells, horns, and other audible alarm devices; visual alarm devices, such as strobe lighting; emergency lighting, including signage and spotlights; smoke detectors; heat detectors; carbon monoxide detectors; natural gas detectors; pull stations; and the like.

A building may have a single control loop 105, as shown in the example of FIG. 1. However, depending on the size or arrangement of the building, multiple control loops 105 can be present, or the devices 115 need not be incorporated into a control loop 105 at all. The multiple control loops 105 may be coupled together, including by coupling a control panel 110 with another control panel 110 that is coupled to other devices 115.

When a control loop 105 is installed in a building or when periodic testing is conducted, typically each device 115 is tested to ensure the device 115 is operating properly and was installed properly. Testing may occur in a variety of different methods, depending on what type of device 115 is being tested. An audible alarm device 115 may be tested by activating the audible alarm and determining if an output is received. For example, a sound-sensitive device such as a microphone or a sound pressure level meter may be in the vicinity of an audible alarm device 115 when the alarm is activated. The sound-sensitive device may be used to determine if the audible alarm is producing sound and if the sound is of the specified level. A visual alarm device 115 may be tested in a similar manner, with the use of a light-sensitive device such as a camera or light detector to determine if the visual alarm device 115 is lighting in the intended manner.

Manually operated devices 115 may be tested by manually operating the device. For example, a fire pull station may be activated by using the pull station in the intended manner to determine if the proper signal is received from the pull station. There also may be push buttons, call boxes, and the like that may be tested in similar manners.

Devices 115 that are detectors may be tested by releasing a small quantity of a substance that may be detected by the subject detector. For example, a specially formulated fog may be released in the vicinity of a smoke alarm to determine if the smoke alarm properly detects the fog and produces the correct signal. Similar means may be used to test carbon monoxide alarms and the like.

A difficulty of such an approach is that it can be time consuming to perform such a test for each device 115 in a control loop 105. For instance, each different type of detector, such as smoke, heat, carbon monoxide, or hazardous gas, must be approached with the appropriate testing substance or condition. Oftentimes, detectors are installed in difficult-to-reach locations including, for example, on tall ceilings. In such cases, much time is spent accessing the detectors utilizing ladders, lift forks, and scaffolding. Similarly, each audible alarm and visual alarm must be individually activated to determine if the proper levels are received. Each manually operated device 115 must be approached to determine if the device 115 works. Some control loops 105 may be very large spatially and numerically. For example, control loops 105 may cover the entirety of a large department store or warehouse, or a large area and multiple floors of an office building, and include many devices 115. Each device 115 in the control loop 105 may be individually addressable, such that testing of each device 115 can be conducted without affecting the operability of other devices 115 in the control loop 105, which allows continued system operation during testing, but such an arrangement requires that each device 115 be tested individually.

To reduce the time and manpower needed to perform such a test, in one or more embodiments, an autonomous inspection system 100 is used to test each component. For example, and not by way of limitation, such testing may occur during commissioning or as maintenance, which can be scheduled to automatically occur periodically. The inspection system 100 may include a UIV 140, which can be used to travel to each component's location to test the component. For instance, such components may include devices 120, 122, 124, 126, and 128, and thus, the UIV 140 may travel to the devices 120, 122, 124, 126, and 128 to test them. The UIV 140 may include transportation components (such as wheels or propellers) that allow the UIV 140 to travel to each location to perform the test. The UIV 140 may further include devices necessary to test the operability of the devices 115 in the control loop 105, as described further below. The UIV 140 may be controlled and observed remotely from another computer system, such that the control center 130. In such a manner, each device 115 of the control loop 105 can be tested without the necessity of a worker physically having to access each device 115.

When traveling to a device 115 or elsewhere, a trajectory of the UIV 140 may be determined in various ways. For example, and not by way of limitation, the UIV 140 may be operated remotely by a human operator; may operate autonomously and intelligently, selecting and optimizing the trajectory while avoiding collisions; may operate autonomously with a pre-defined trajectory; or a combination of these mechanisms. In some embodiments, for instance, the UIV 140 includes an autonomous algorithm for pathfinding without the need for a trajectory to be remotely determined and controlled.

Figure 2:
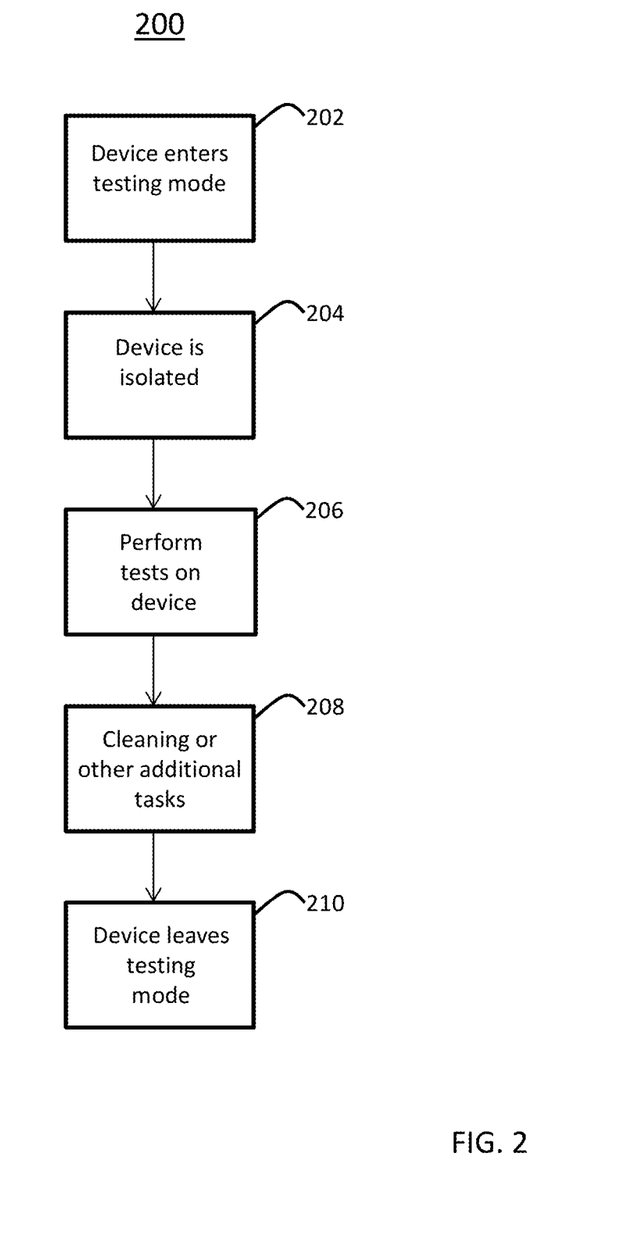
FIG. 2 is a flowchart illustrating the operation of one or more embodiments.

With respect to FIG. 2, a method 200 is presented that illustrates the operation of one or more embodiments. Method 200 is merely exemplary and is not limited to the embodiments presented herein. Method 200 may be employed in many different embodiments or examples not specifically depicted or described herein. In some embodiments, the procedures, processes, and/or activities of method 200 may be performed in the order presented. In other embodiments, one or more of the procedures, processes, and/or activities of method 200 may be combined, skipped, or performed in a different order.

Method 200 discloses a testing mode of a device 115. In a traditional control loop 105, each device 115 is coupled to each of the other devices 115 in a loop configuration as described above with reference to FIG. 1. In such a use case, it is not possible to test, for example, device 122 without affecting device 126 or without setting off control panel 110.

In most newer installations, detection & alarm (D&A) devices 115 are addressable. However, even with new installations, the notification devices (e.g., strobes, horns, pull stations, or other notification appliances) are not addressable. Consequently the D&A devices and notification devices are typically installed in separate loops connecting to the control panel 110; the notification devices are installed in a separate notification appliance circuit (NAC). It would be advantageous to place D&A and notification devices onto a single loop. But there are some restrictions, for example, having to do with appropriate level of power supplied to the devices.

However, in all cases, when a particular control loop 105 or zone with devices 115 on the control loop 105 is under test, that control loop 105, and, more specifically, the devices 115 collectively included in that control loop 105, can no longer function to detect an alarm and issue an alarm. Nearby devices 115 may communicate and re-route information to minimize any impact of unavailable capability. The network is aware of potential decreased capability and is able to provide alerts accounting for the lost capability. The network may automatically reactivate original functionality, communication routes, and set-points when the network detects that the previously lost node has been reactivated.

In other words, if a smoke detector in a control loop 105 is activated, the devices 115 that are audible alarms and visual alarms are also activated. If one audible alarm is activated, all the audible alarms in the control loop 105 are activated. Because of such a limitation, testing or installation of a control loop 105 should be scheduled to cause as little disruption as possible. This may involve conducting testing after business hours or in whatever manner is determined to cause the least disruption.

The use of testing mode can be used to perform testing of individual devices 115 within a control loop 105. Each of the devices 115 in the control loop 105 has a unique identifier (such as a serial number or a device identifier assigned at installation). Thus, each of the devices 115 is individually addressable, meaning that a controller may send messages to and receive messages from an individual device 115 without having the message affect other devices 115 in the control loop 105.

A device 115 is selected to enter testing mode (block 202). The device 115 being tested may be selected in one of a variety of different manners. In some embodiments, the control panel 110 selects the device 115 being tested. When being used with a UIV 140 (described in further detail below), the UIV 140 may select the device 115 to be tested. This may be accomplished by having the UIV 140 detect the device 115 for example, by using machine vision, or as another example by sensing a signal broadcast by the device 115 to determine which device 115 is being tested. Thereafter, the UIV 140 may broadcast a signal to the device 115, signaling the device 115 to enter the test mode. In some embodiments, after identifying the device 115 being tested, the UIV 115 may transmit a signal to the control panel 110, which thereafter sends an instruction to the device 115 to enter the test mode.

Once the device 115 is in test mode, the device 115 may be isolated from the control loop 105 (block 204). This may take place in one of a variety of different manners. For a device 115 that is a sensor, such as a smoke detector, the control panel 110 is instructed to ignore signals coming from the device 115 being tested, such that the signals are not forwarded to other devices 115 coupled to the control loop 105.

As explained briefly below, in a control loop 105, typically all of the devices 115 in the loop react to an alarm signal. For example, if a smoke detector detects smoke, audible and visual alarms in the control loop 105 may be configured to activate. In such a manner, a single smoke detector may cause a large number of people to react to the detection of smoke because multiple audible alarms and visual alarms are activated.

When in test mode, signals from that detector will be ignored for the purposes of triggering alarms, in some embodiments. The control panel 110 may detect the signals to determine if the device 115 is operational, but the control panel 110 need not act upon the signal and trigger alarms.

For an audible or visual alarm device 115, the test mode causes only that particular device 115 to respond to the test signals. In some embodiments, the other audible or visual alarm devices 115 will not be activated.

In some embodiments, communication with other devices 115 may be tested. For example, in a mesh system, each device 115 may be tested to check if it can send or receive transmissions from neighboring devices 115. In a test mode, this capability may be tested by passing information to neighboring devices 115, but the information is noted to be test information.

For a manually operated device 115, such as a fire alarm pull station, the control panel 110 may be set to ignore signals from the manually operated device being tested for alarm purposes. In other words, when the pull station is operated, the control panel senses the signal for testing purposes, but does not activate and audible or visual alarm devices as it normally would when a manually operated device is activated. The alerts generated are not forwarded to other devices within the loop.

The device is then tested (block 206). Testing a sensor (such as a smoke detector or other type of detector) may involve creating a condition that is to be detected. For example, a smoke-like substance may be released in the vicinity of a smoke detector to determine if the smoke detector is operable. In some embodiments, a UIV 140 may be used to create the condition being tested. For instance, the UIV 140 may be configured to carry and spray fog, to emit sound or light, or to perform various other activities that can be used to test operability of a device 115, such as a detector.

Testing an audible or visual alarm device may involve triggering the audible or visual alarm device and determining if the output is within specification. In some embodiments, a UIV is equipped with a sound-pressure-level measuring component or a light level detecting component. The UIV is placed a predetermined location away from the audible or visual alarm device. Thereafter, the audible or visual alarm device is activated. For example, an audible alarm device might be rated to create a sound that is 100 dB at a certain distance away from the audible alarm device. The audible alarm device is placed at a distance away from the audible alarm and measures the sound pressure level caused by the audible alarm device, using a microphone or sound pressure level meter. A similar measurement may be performed for light emitted by a visual alarm device, such as a strobe light intended to flash in case of emergency, using a camera or light level meter.

In some embodiments, testing may include testing the health of one or more components of the device 115, such as a battery, a speaker, or a pull handle of the device 115. Such testing may include activating each such component in turn and confirming that the expected result is observed by the UIV 140, or determining a remaining life of the component.

Additionally or alternatively to the testing described above, the UIV 140 may perform cleaning or other additional maintenance tasks on the device 115 (block 208). In some embodiments, these maintenance tasks may be performed along with testing, such that when the UIV 140 performs test on a device 115, the UIV 140 additionally performs maintenance on the device 115. For example, and not by way of limitation, such maintenance may include the following: cleaning; checking that a light-emitting diode (LED), if applicable, of the device 115 is clean and steady; or vacuuming the device 115 using a vacuum installed on the UIV 140, such as to remove smoke, chemicals, or dust from the device 115. Regular cleaning, such as vacuuming, can extend the life of detectors and other devices 115. In the case of cleaning or other activities, the operations performed may be limited to those that are deemed unlikely to activate device 115 (e.g., unlikely to set off an alarm). For instance, if the device 115 is heat sensitive, then heat will not be used to clean the device 115, or if the device 115 is sensitive to liquids, then a dry cleaning may be performed.

In some embodiments, when maintenance testing is performed in conjunction with maintenance cleaning or other maintenance tasks, at least a portion of the testing may performed after the cleaning or other tasks, to confirm that such cleaning or other tasks have not negatively impacted the operability of the device 115. For example, and not by way of limitation, a status indicated by an LED of the device 115, as described below, may be checked after cleaning to ensure that cleaning has not negatively impacted the device's status. However, it will be understood that this particular ordering is not mandatory.

In some embodiments, a maintenance task performed on the device 115 may include replacing or repairing a component of the device, such as a battery. In that case, the UIV 140 may be capable of carrying a spare battery and may be equipped with appropriate mechanical, robotic, or other mechanism to open the battery door, remove and store the current battery, and insert the spare battery. It will be understood that, for each component to be replaced or repaired, the UIV 140 may be configured to perform the required replace or repair task.

In some embodiments, a device 115 may incorporate an LED that emits a light in a color or pattern, or a combination of color and pattern, to indicate a status of the device. For example, and not by way of limitation, a first solid color (e.g., green) may indicate that the device 115 appears to be operating normally, based on internally detected measures, while a second solid color or pattern (e.g., red or flashing yellow) may indicate internal detection of an abnormal condition. The UIV 140 may be configured to detect the color or pattern of such an LED, such as by way of machine vision incorporating a camera installed on the UIV 140, so as to determine the status of the device 115 as part of testing or maintenance the device 115, or after testing or maintenance of the device 115.

Additionally or alternatively, in some embodiments, the UIV 140 may capture one or more photographs of each device 115 to include in a record associated with the device 115. Such photographs may be transmitted to the control center 130 for storage.

After testing or other maintenance tasks, the device 115 may then be removed from testing mode (block 210) and may thus return to normal operation.

The UIV 140 will now be addressed. As discussed above, the UIV 140 is an unmanned inspection vehicle. The UIV 140 can take one of a variety of different forms. In some embodiments, the UIV 140 is an unmanned aerial vehicle, also known as a UAV, or popularly referred to as a drone. The UIV 140 may be a quadcopter or other multirotor rotorcoptor that is capable of being remotely controlled. In some embodiments, the UIV 140 includes computing capabilities, such as a processor and memory. The UIV 140 also may include any form of wired or wireless communication capabilities. In such a manner, UIV 140 can communicate with the control panel 110 and/or the control center 130. In some embodiments, a remotely located device with computing capabilities, including a processor and memory is used to control the UIV 140.

In some embodiments, the UIV may be embodied as a wheeled vehicle that is capable of being remotely controlled. In some embodiments, a combination of vehicles may be used. For example, a wheeled vehicle may be used in conjunction with a UAV. In such an embodiment, the wheeled vehicle is used to transport the UAV from device to device. In some instances, the testing could be performed solely with the wheeled vehicle. However, there could be instances where the device to be tested is too far from the ground to be tested from a wheeled cart (for example, a ceiling-mounted smoke alarm in an area with tall ceilings or an elevator hoistway). An advantage of a combination of a wheeled vehicle with a UAV is that, in such an embodiment, the dangers of a UAV flying over people could be reduced, because the UAV could be configured to only fly in a vertical direction from the wheeled vehicle. Another exemplary type of UIV is a small, remotely controlled wheeled vehicle that is configured to travel along a path close to the ceiling of a building. In some installations, many devices in a control loop are installed in the ceiling or on a wall at a height near the ceiling. Another exemplary type of UIV may be configured to travel through ductwork of an installation, provided that at least one of the devices in the installation is installed in or near the ducts.

The UIV may be outfitted with equipment that allows the testing of devices to be conducted. For example, the UIV may be outfitted with a microphone or sound-pressure-level meter when used to test an audible alarm device. The UIV may be outfitted with a camera or light level meter when used to test a visual alarm device.

When testing a sensor such as a smoke detector or other detector, the UIV may be equipped with a dispenser. The dispenser may be configured to dispense a substance to test the detector, such as via an aerosol, steam, smoke, fog, or heated air. Other types of sensors may be tested in a similar manner, such as carbon monoxide, methane gas, other flammable gases, ozone sensors, or carbon dioxide sensors.

When testing a manually operated device, the UIV may be equipped with an actuator arm. A manually operated device, such as a fire alarm pull station (or call point), is typically activated by moving the pull station in a certain direction. When fully pulled to the direction, a circuit is closed and a signal is sent to the control panel that an alarm should be sounded.

During testing, the UIV may be configured to use the actuator or an arm coupled to the actuator to activate the pull station. For some fire alarm call boxes, this could be as simple as pulling down a lever. For other fire alarm call boxes, a two-stage process is undertaken in order to activate the pull station, such as pushing in a shield to access the pull level and then pulling the level to activate alarm. Yet, in other cases, it may be necessary to pull open a shield to access a push level and then pushing the level to activate an alarm.

The UIV may be equipped with capability to identify devices. Machine vision capabilities may be used. Machine vision may include identifying the device merely by capturing an image of the device. In some embodiments, the device may include a quick response code (QR code) that includes a unique identifier for the device. The UIV could be equipped with a camera and processing capabilities (or transceiver capabilities, where the UIV transmits data for processing). The UIV may visually identify the presence of a device to be tested. For example, when the UIV is tasked with finding a smoke detector, the UIV may utilize machine vision to identify a smoke detector. As the UIV travels through an area, it may find a smoke detector, determine the unique identifier of the smoke detector, and begin a testing process of the smoke detector. Similar tasks may be used to test an audible or visual alarm device.

Such capabilities may be used in conjunction with transceiver capabilities. For example, a device to be tested may be configured to transmit a signal by one of a variety of different manners (e.g., near field communication, Bluetooth, WiFi, or any other type of communication.) The device to be tested could be configured to transmit information including a unique identifier. The UIV may use the unique identifier to ensure that it is testing the correct device.

In some embodiments, additionally or alternatively to using wireless transmission, a simpler and less expensive system may be used. For example, each of the devices could be equipped with one or more LEDs. The LEDs may or may not transmit light in the visible spectrum. The LEDs may be set to broadcast a certain signal, such as patterns of on and off pulses, to identify the device. An advantage of using an LED in this manner is that each device would no longer need a radio transmitter, lowering the cost of the device. The use of LEDs may also avoid the over use of radio frequencies in certain band ranges. For example, WiFi or Bluetooth signals could interfere with WiFi signals, cell phones, cordless phones, and the like. When a device utilizes an LED, the UIV 140 may detect the signal emitted by the LED, such as color or pattern, to identify the device 115.

Similar techniques may be performed with respect to audio signals. A device to be tested may be configured to emit an audio signal in order to enable a UIV 140 to find the device to be tested.

In some embodiments, location coordinates of the device may be previously known and transmitted to the UIV 140, causing the UIV 140 to travel to the known location of the device 115 being tested. For instance, the UIV 140 may have access to an architectural floor plan of the building, indicating the location of various devices 115. For example, and not by way of limitation, the control center 130 may have access to such a floor plan or such location, and the control center 130 may communicate, to the UIV 140, the absolute or relative location of the device 115.

Other methods may be used to identify the device being tested. As described above, a control panel 110 may be used to direct the testing. The control panel 110 may cause the device to be tested to broadcast the desired signal that may be received by the UIV 140.

In some embodiments, the UIV 140 may be in remote communication with the control center 130, which may manage testing of one or more control loops 105, such as the control loop 105 shown in FIG. 1. The control center 130 may communicate with the UIV 140, such as by way of wireless communication, such as WiFi or Bluetooth, for example. The control center 130 may be a computer system or portion thereof, and the control center 130 may direct testing of devices 115 through the UIV 140 as described herein, automatically or under manual direction.

In some embodiments, the control center 130 may direct the UIV 140 to one or more devices 115 for testing of such devices 115. For example, and not by way of limitation, the control center 130 may direct such testing to occur during commissioning of a device 115 or as maintenance, which may be scheduled by the control center 130. For example, and not by way of limitation, the control center 130 may execute a program, in which a schedule is defined (e.g., a frequency or specific dates and times). According to schedule, the control center 130 may direct the UIV 140 to initiate testing of one or more devices 115. Upon this direction, testing may proceed according to the method 200 described above or a similar method.

The UIV 140 may communicate to the control center 130 the results of testing the devices 115. For instance, for each test performed on each device 115 by the UIV 140, the UIV 140 may report testing data, including the result of the test, to the control center 130. The testing data may be raw data or may incorporate one or more levels of abstraction, such that, for instance, the testing data transmitted may be the result of a diagnostics algorithm applied to raw data directly resulting from one or more tests. Thus, the control center 130 may direct testing, and the UIV 140 may report the results back to the control center 130. In some embodiments, if a human is operating the control center 130, the human operator may manually monitor testing or other tasks performed by the UIV 140 on one or more device 115. Further, in some embodiments, the control panel 110 is located proximate the control center 130, such that the human operator can monitor both the control panel 110 and the control center 130, if both are being used to test or monitor the devices 115.

The control center 130 may store, for each device 115 or for each control loop 105, an indication of each test performed and the result of the test. As a result, the control center 130 may maintain a record of the testing history of each control loop 105 or of each device 105. Such records may be useful in recognizing or analyzing ongoing issues with the devices 115. In some embodiments, the control center 130 is configured to generate reports on a schedule or on demand, based on the testing history of the devices 115.

In some embodiments, testing during commissioning may include the same tasks, or different tasks, as maintenance testing. For instance, commission testing may include one or more tests performed for maintenance but, additionally or alternatively, may include testing specifically for commissioning. For example, and not by way of limitation, during commissioning of a device 115, the UIV 140 may confirm that the device 115 has been installed at a pre-established location that has been selected for the device 115.

As described above, some embodiments can save significant time in the commission and maintenance of devices 115 in commercial buildings and elsewhere. Further, utilizing embodiments of this disclosure over conventional methods, maintenance of devices 115 can be improved, and thus the life of devices 115 can be increased without physical work being performed by human technicians.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for testing a device in a control system comprising:
   placing the device in a testing mode;
   isolating the device from other devices in the control system;
   testing the device, wherein testing the device comprises using an unmanned inspection vehicle (UIV) to perform one or more tests on the device, wherein the unmanned inspection vehicle comprises a remotely operated vehicle configured to travel to a vicinity of the device for testing; and
   removing the device from testing mode;
   finding the device prior to placing the device in the testing mode; wherein:
   finding the device comprises using the unmanned inspection vehicle to find the device;
   wherein finding the device comprises using machine vision capabilities of the unmanned inspection vehicle to identify the device.

2. The method of claim 1 wherein:
   the unmanned inspection vehicle is remotely operated by a control center; and
   the unmanned inspection vehicle transmits to the control center a result of testing the device.

3. The method of claim 1 wherein:
   the unmanned inspection vehicle comprises an unmanned aerial vehicle or an unmanned ground vehicle.

4. The method of claim 1 wherein:
   the unmanned inspection vehicle is configured to:
   travel to a predetermined distance from the device; and
   measure at least one of audio output or visual output from the device.

5. The method of claim 1 wherein:
   the unmanned inspection vehicle is configured to:
   dispense a substance in the vicinity of the device, the substance configured to activate a sensor.

6. A method for testing a device in a control system comprising:
    placing the device in a testing mode;
    isolating the device from other devices in the control system;
    testing the device, wherein testing the device comprises using a unmanned inspection vehicle (UIV) to perform one or more tests on the device, wherein the unmanned inspection vehicle comprises a remotely operated vehicle configured to travel to a vicinity of the device for testing; and
    removing the device from testing mode;
    finding the device prior to placing the device in the testing mode;
    wherein:
    finding the device comprises using the unmanned inspection vehicle to find the device;
    wherein finding the device comprises:
    configuring the device to broadcast a location signal; and
    using the unmanned inspection vehicle to receive the location signal and travel to the location of the device.

7. The method of claim 6 wherein:
    broadcasting the location signal comprises broadcasting a unique identifier of the device by one or more audio or visual signals.

8. The method of claim 1 further comprising:
    finding the device prior to placing the device in the testing mode; wherein:
    finding the device comprises using the unmanned inspection vehicle to find the device;
    wherein finding the device comprises sending the unmanned inspection vehicle to proceed to a known location of the device.

9. The method of claim 1 wherein:
    isolating the device comprises configuring a control panel coupled to the device such that the device does not receive alarm signals from the control panel and the control panel does not forward alerts generated by the device to other devices coupled to the control panel.

10. A system for testing a device in a fire alarm system, the system comprising:
    a control panel including a processor and a memory; and
    an unmanned inspection vehicle;
    the processor configured to perform a method comprising:
    placing the device in a testing mode;
    isolating the device from other devices in the fire alarm system;
    testing the device; and
    removing the device from testing mode; wherein:
    testing the device comprises using the unmanned inspection vehicle to remotely perform tests on the device, wherein the unmanned inspection vehicle comprises a remotely operated vehicle configured to travel to a vicinity of the device for testing;
    finding the device prior to placing the device in the testing mode;
    wherein:
    finding the device comprises using the unmanned inspection vehicle to find the device;
    wherein finding the device comprises:
    configuring the device to broadcast a location signal; and
    using the unmanned inspection vehicle to receive the location signal and travel to the location of the device.

11. The system of claim 10 wherein:
    the unmanned inspection vehicle comprises a remotely operated vehicle configured to travel to a vicinity of the device for testing.

12. The system of claim 10 wherein:
    the unmanned inspection vehicle is configured to:
    travel to a predetermined distance from the device; and
    measure audio or visual output from the device upon activation of the device.

13. The system of claim 10 wherein:
    the unmanned inspection vehicle is configured to:
    dispense a substance in the vicinity of the device, wherein the substance configured to activate a sensor.

14. The system of claim 10 wherein:
    the unmanned inspection vehicle is configured to clean the device.

15. The system of claim 10 wherein
    the unmanned inspection vehicle is configured to perform at least one of replacing a component of the device and repairing a component of the device.

16. The system of claim 10 wherein:
    the unmanned inspection vehicle is configured to transmit, to a control center, testing data comprising a result of testing the device.

17. The system of claim 16 wherein:
    the control center is configured to generate a report describing a testing history of the device, based at least in part on the testing data.

18. The system of claim 10 wherein:
    the unmanned inspection vehicle is configured to:
    activate a manually operated device.

19. The system of claim 10 wherein:
    isolating the device comprises configuring a control panel coupled to the device such that the device does not receive alarm signals from the control panel and the control panel does not forward alerts generated by the device to other devices coupled to the control panel.

* * * * *